(12) United States Patent
Wen et al.

(10) Patent No.: US 11,340,903 B2
(45) Date of Patent: May 24, 2022

(54) PROCESSING METHOD, DEVICE, EQUIPMENT AND STORAGE MEDIUM OF LOOP INSTRUCTION

(71) Applicant: BEIJING BAIDU NETCOM SCIENCE TECHNOLOGY CO., LTD., Beijing (CN)

(72) Inventors: Junhui Wen, Beijing (CN); Chao Tian, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/210,046

(22) Filed: Mar. 23, 2021

(65) Prior Publication Data

US 2021/0208891 A1    Jul. 8, 2021

(30) Foreign Application Priority Data

Aug. 27, 2020   (CN) .......................... 202010878243.0

(51) Int. Cl.
*G06F 9/30* (2018.01)
*G06F 9/38* (2018.01)
*G06F 9/32* (2018.01)

(52) U.S. Cl.
CPC .......... *G06F 9/381* (2013.01); *G06F 9/30101* (2013.01); *G06F 9/30152* (2013.01); *G06F 9/30189* (2013.01); *G06F 9/325* (2013.01)

(58) Field of Classification Search
CPC .. G06F 9/325; G06F 9/30189; G06F 9/30152; G06F 9/30101; G06F 9/381
See application file for complete search history.

(56) References Cited

U.S. PATENT DOCUMENTS 5,842,022 A * 11/1998 Nakahira ................ G06F 8/452
                                                           717/160
5,958,048 A    9/1999 Babaian
(Continued)

FOREIGN PATENT DOCUMENTS

CN         1372190 A    10/2002
CN       102043886 A     5/2011
(Continued)

OTHER PUBLICATIONS

The EESR of EP application No. 21164607.0.
(Continued)

*Primary Examiner* — Corey S Faherty
(74) *Attorney, Agent, or Firm* — J.C. Patents

(57) ABSTRACT

The present application discloses a processing method, device, equipment and storage medium of a loop instruction, and relates to the fields of voice and chips. A specific embodiment is: acquiring a computer program including a first loop body, where the first loop body is generated according to a second loop body in a software code to be compiled, the first loop body includes a plurality of first loop instructions, the plurality of first loop instructions can be identified by a hardware structure of a computer device; in the case that the first loop body is detected, determining loop parameters of the first loop body according to the plurality of first loop instructions; acquiring the plurality of first loop instructions according to the loop parameters of the first loop body; executing the plurality of first loop instructions.

20 Claims, 6 Drawing Sheets

(56) References Cited

U.S. PATENT DOCUMENTS

| | | | |
|---|---|---|---|
| 6,192,515 B1 * | 2/2001 | Doshi | G06F 8/4452 |
| | | | 712/241 |
| 6,820,250 B2 * | 11/2004 | Muthukumar | G06F 8/4452 |
| | | | 717/116 |
| 8,930,929 B2 * | 1/2015 | Ahn | G06F 9/5066 |
| | | | 717/160 |
| 9,760,356 B2 * | 9/2017 | Duran Gonzalez | G06F 8/452 |
| 10,732,945 B1 * | 8/2020 | Chirca | G06F 8/433 |
| 2003/0163679 A1 | 8/2003 | Ganapathy | |
| 2006/0084459 A1 | 4/2006 | Phan | |
| 2009/0222124 A1 | 9/2009 | Latwesen | |
| 2017/0255467 A1 | 9/2017 | Johnson | |

FOREIGN PATENT DOCUMENTS

| | | |
|---|---|---|
| CN | 102508635 A | 6/2012 |
| CN | 108780397 A | 11/2018 |
| CN | 109032665 A | 12/2018 |
| CN | 111522584 A | 8/2020 |
| JP | H07160585 | 6/1995 |
| JP | 2000276351 | 10/2000 |

OTHER PUBLICATIONS

The First OA of the Priority Application.
The third Office Action of the priority CN application.
Non-final Office Action of JP application No. 2021052374.

* cited by examiner

PROCESSING METHOD, DEVICE, EQUIPMENT AND STORAGE MEDIUM OF LOOP INSTRUCTION

CROSS-REFERENCE TO RELATED APPLICATION

This application claims priority to Chinese Patent Application No. 202010878243.0, filed on Aug. 27, 2020, which is hereby incorporated by reference in its entirety.

TECHNICAL FILED

Embodiments of the present application relate to voice technology and chip technology in computer technologies, and particularly to a processing method, device, equipment, and storage medium of loop instructions.

BACKGROUND

In computers, loop statements written in high-level languages are often used. For example, in voice signal processing scenarios, it is often necessary to perform digital signal processing on a voice data array. Then a for loop (for i=0; i<N; i++) statement is used to traverse the array, and the for loop statement after compiled by a compiler is usually compiled into several addition instructions and a conditional branch jump instruction. In a specific implementation, it is determined whether the number of a loop is 0. If it is not 0, it is necessary to use the conditional branch jump instruction to return and continue to execute the addition instructions, so as to achieve an loop effect.

At present, in the above process of calculating the number of the loop and determining the end of the loop, it is based on the state of the program to predict the number of the loop and determine the end of the loop, so there will be a problem of inaccurate prediction.

SUMMARY

The present application provides a processing method, device, equipment, and storage medium of loop instructions, for improving the accuracy of acquiring loop parameters such as the number of a loop, and start addresses and end addresses of the loop.

According to a first aspect of the present application, there is provided a processing method of loop instructions, including: acquiring a computer program, where the computer program includes a first loop body, the first loop body is generated according to a second loop body in a software code to be compiled, the first loop body includes a plurality of first loop Instructions, the plurality of first loop instructions are instructions that can be identified by a hardware structure of a computer device; determining loop parameters of the first loop body according to the plurality of first loop instructions in the case where the first loop body is detected; acquiring the plurality of first loop instructions according to the loop parameters of the first loop body; and executing the plurality of first loop instructions.

Optionally, the computer program includes a plurality of computer instructions; the loop parameters include an end address of a loop and the number of the loop N, where N is a positive integer greater than or equal to 0, and the number of the loop is determined according to the first loop body; the hardware structure includes an end address register, a buffer register, and a long loop flag register; the determining the loop parameters of the first loop body according to the plurality of first loop instructions in the case where the first loop body is detected, includes: if it is detected that a computer instruction is a first loop instruction and a remaining storage space of the buffer register is not 0, then storing the computer instruction into the buffer register, storing an address corresponding to the computer instruction into the end address register, and setting a flag bit of the long loop flag register to be as a short loop identifier, the short loop identifier being used to identify that a storage space occupied by first loop instructions currently stored in the buffer register is less than or equal to a total storage space of the buffer register; determining the end address of the loop according to an end address stored in the end address register.

Optionally, the hardware structure includes a start address register, and the method further includes: if it is detected that a computer instruction is a first loop instruction and the remaining storage space of the buffer register is 0, then storing the address corresponding to the computer instruction into the start address register, and setting the flag bit of the long loop flag register to be as a long loop identifier; identifying, by the long loop identifier, that the storage space occupied by the first loop instructions currently stored in the buffer register is greater than the total storage space of the buffer register; in the case where a computer instruction acquired later is a first loop instruction, storing an address corresponding to the computer instruction acquired later into the end address register until all the computer instructions are acquired.

Optionally, the acquiring the plurality of first loop instructions according to the loop parameters of the first loop body includes: if the flag bit of the long loop flag register is the short loop flag, performing an operation of acquiring all the first loop instructions from the buffer register for N times.

Optionally, after it is detected that the computer instruction is the first loop instruction, the method further includes: executing the first loop instruction; the acquiring the plurality of first loop instructions according to the loop parameters of the first loop body includes: if the flag bit of the long loop flag register is the short loop identifier, then performing an operation of acquiring all the first loop instructions from the buffer register for N−1 times.

Optionally, the acquiring the plurality of first loop instructions according to the loop parameters of the first loop body includes: if the flag bit of the long loop flag register is the long loop identifier, then performing an operation of acquiring all the first loop instructions from the buffer register for N times; and performing an operation of acquiring a corresponding first loop instruction from a program memory of the computer device starting from a start address recorded in a start register until acquiring a first loop instruction corresponding to the end address, for N times.

Optionally, after it is detected that the computer instruction is the first loop instruction, the method further includes: executing the first loop instruction; the acquiring the plurality of first loop instructions according to the loop parameters of the first loop body includes: if the flag bit of the long loop flag register is the long loop identifier, then performing an operation of acquiring all the first loop instructions from the buffer register for N−1 times; and performing an operation of acquiring a corresponding first loop instruction from a program memory of the computer device starting from a start address recorded in a start register until acquiring a first loop instruction corresponding to the end address for N−1 times.

Optionally, the computer program includes a plurality of computer instructions; the loop parameters include a start address, an end address and the number of a loop, the number of the loop is N, and N is an integer greater than 0, the number of the loop is determined according to the first loop body; and the hardware structure includes a start address register and an end address register; determining the loop parameters of the first loop body according to the plurality of first loop instructions in the case where the first loop body is detected, includes: if it is the first time that a computer instruction is detected as a first loop instruction, then storing an address corresponding to the computer instruction into the start address register; if it is not the first time that the computer instruction is detected as the first loop instruction, storing the address corresponding to the computer instruction into the end address register until all the computer instructions are acquired, where an address corresponding to a first loop instruction detected for the last time is the end address.

Optionally, the acquiring the plurality of first loop instructions according to the loop parameters of the first loop body includes: performing an operation of acquiring a corresponding first loop instruction from a program memory of the computer device starting from a start address recorded in a start register until acquiring a first loop instruction corresponding to the end address for N times.

Optionally, the method further includes: executing a first loop instruction detected each time; the acquiring the plurality of first loop instructions according to the loop parameters of the first loop body includes: performing an operation of acquiring a corresponding first loop instruction from a program memory of the computer device starting from a start address recorded in a start register until acquiring a first loop instruction corresponding to the end address, for N−1 times.

Optionally, the first loop instructions include a loop loop instruction; a second loop instruction includes a for loop instruction.

Optionally, the first loop body includes a pair of loop loop instructions, and the pair of loop loop instructions are respectively used to indicate start and end of a loop loop.

Optionally, the method further includes: storing the number of the loop into a general register of the computer device.

Optionally, the hardware structure further includes: a loop number counter; the determining the loop parameter of the first loop body according to the plurality of first loop instructions in the case where the first loop body is detected, further includes: acquiring the number of the loop from the general register; and storing the number of the loop into the loop number counter.

According to a second aspect of the present application, there is provided a processing device of loop instructions, including: an instruction fetch unit configured to acquire a computer program, where the computer program includes a first loop body, the first loop body is generated according to a second loop body in a software code to be compiled, the first loop body includes a plurality of first loop instructions, and the plurality of first loop instructions are instructions that can be identified by a hardware structure of a computer device; the hardware structure configured to determine the loop parameters of the first loop body according to the plurality of first loop instructions in the case where the first loop body is detected; the instruction fetch unit is further configured to acquire the plurality of first loop instructions according to the loop parameters of the first loop body; and a processing unit configured to execute the plurality of first loop instructions.

Optionally, the computer program includes plurality of computer instructions; the loop parameters include an end address of a loop and the number of the loop N, where N is a positive integer greater than or equal to 0, and the number of the loop is determined according to the first loop body; the hardware structure includes a detection unit, an end address register, a buffer register, and a long loop flag register; the detection unit is configured to detect whether a computer instruction is a first loop instruction, and in the case where it is detected that the computer instruction is the first loop instruction and a remaining storage space of the buffer register is not 0, send the computer instruction to the buffer register, send an address corresponding to the computer instruction to the end address register, and send an instruction of setting a short loop identifier to the long loop flag register, the short loop identifier is configured to identify that a storage space occupied by first loop instructions currently stored in the buffer register is less than or equal to a total storage space of the buffer register; the buffer register is configured to store the computer instructions; the end address register is configured to store addresses corresponding to the computer instructions; the long loop flag register is configured to set s flag bit of the long loop flag register to be as a short loop identifier; the instruction fetch unit is further configured to determine an end address of the loop according to an end address stored in the end address register.

Optionally, the hardware structure further includes a start address register; the detection unit is further configured to send the address corresponding to the computer instruction to the start address register, and send an instruction of setting a long loop identifier to the long loop flag register in the case where it is detected that the computer instruction is the first loop instruction, and the remaining storage space of the buffer register is 0; the long loop identifier is configured to identify that the storage space occupied by the first loop instructions currently stored in the buffer register is greater than the total storage space of the buffer register; the start address register is configured to store the address corresponding to the computer instruction; the long loop flag register is configured to set the flag bit of the long loop flag register to be as the long loop identifier; the detection unit is further configured to send an address corresponding to a computer instruction acquired later to the end address register in the case where the computer instruction acquired later is the first loop instruction, until all computer instructions are acquired; and the end address register is further configured to store the address corresponding to the computer instruction acquired later.

Optionally, the instruction fetch unit is further configured to, if the flag bit of the long loop flag register is the short loop identifier, and then perform an operation of acquiring all the first loop instructions from the buffer register for N times.

Optionally, the processing unit is further configured to, if it is detected that the computer instruction is the first loop instruction, execute the first loop instruction; the instruction fetch unit is further configured to, if the flag bit of the long loop flag register is the short loop identifier, perform an operation of acquiring all the first loop instructions from the buffer register for N−1 times.

Optionally, the instruction fetch unit is further configured to: if the flag bit of the long loop flag register is the long loop flag, perform an operation of acquiring all the first loop instructions from the buffer register for N times; and perform an operation of acquiring a corresponding first loop instruction from a program memory of the computer device starting from a start address recorded in the start register until acquiring a first loop instruction corresponding to the end address, for N times.

Optionally, the processing unit is further configured to execute the first loop instruction if it is detected that the computer instruction is the first loop instruction; the instruction fetch unit is further configured to: if the flag bit of the long loop flag register is a long loop identifier, perform an operation of acquiring all the first-cycle instructions from the buffer register for N−1 times; and perform an operation of acquiring a corresponding first loop instruction from a program memory of the computer device starting from a start address recorded in the start register until acquiring a first loop instruction corresponding to the end address is acquired, for N−1 times.

Optionally, the computer program includes a plurality of computer instructions; the loop parameters include a start address, an end address and the number of a loop, the number of the loop is N, N is an integer greater than 0, the number of the loop is determined according to the first loop body; the hardware structure includes a start address register and an end address register; the detection unit is further configured to send an address corresponding to a computer instruction to the start address register if it is the first time that the computer instruction is detected as a first loop instruction; and, if it is not the first time that the computer instruction is detected as the first loop instruction, send the address corresponding to the computer instruction to the end address register until all the computer instructions are acquired, where an address corresponding to the first loop instruction detected for the last time is the end address; the start address register is configured to take the address corresponding to the computer instruction to be as the start address of the loop and store it; and the end address register is configured to take the address corresponding to the computer instruction to be as the end address of the loop and store it.

Optionally, the instruction fetch unit is further configured to perform an operation of acquiring a corresponding first loop instruction from a program memory of the computer device starting from a start address recorded in a start register until acquiring the first loop instruction corresponding to the end address, for N times.

Optionally, Optionally, the processing unit is further configured to execute a first loop instruction detected each time; the instruction fetch unit is further configured to perform an operation of acquiring the corresponding first loop instruction from a program memory of the computer device starting from a start address recorded in a start register until acquiring the first loop instruction corresponding to the end address, for N−1 times.

Optionally, the first loop instruction includes a loop loop instruction; a second loop instruction includes a for loop instruction.

Optionally, the first loop body includes a pair of loop loop instructions, and the pair of loop loop instructions are respectively configured to indicate start and end of a loop loop.

Optionally, the computer device further includes: a general register, configured to store the number of the loop.

Optionally, the hardware structure further includes: a loop number counter; the detection unit is further configured to acquire the number of the loop from the general register and send it to the loop number counter; the loop number counter is configured to store the number of the loop, and every time the instruction fetch unit acquires all the first loop instructions in the first loop body, the number of the loop is reduced by one.

According to a third aspect of the present application, there is provided an electronic equipment including: at least one processor; and a memory communicatively connected to the at least one processor; where the memory stores instructions that are executable by the at least one processor, and the instructions are executed by the at least one processor, so that the at least one processor can execute the method described in the first aspect.

According to a fourth aspect of the present application, there is provided a non-transitory computer-readable storage medium storing computer instructions for causing a computer to execute the method described in the first aspect.

The technology according to the present application solves the problem of inaccurate prediction caused by predicting the number of a loop and determining the end of the loop according to the state of the program.

It should be understood that the content described in this section is not intended to identify key or important features of the embodiments of the present application, nor is it intended to limit the scope of the present application.

BRIEF DESCRIPTION OF THE DRAWINGS

The drawings are used for a better understanding of the solution and do not constitute a limitation of the present application. Where.

DESCRIPTION OF EMBODIMENTS

The following describes the exemplary embodiments of the present application in combination with the accompanying drawings, including various details of the embodiments of the present application for the sake of understanding, which should be considered as merely exemplary. Therefore, those skilled in the art should recognize that various changes and modifications can be made to the embodiments described herein without departing from the scope and spirit of the present application. Similarly, for the sake of clarity and conciseness, the descriptions of well-known functions and structures are omitted in the following description.

Figure 1:
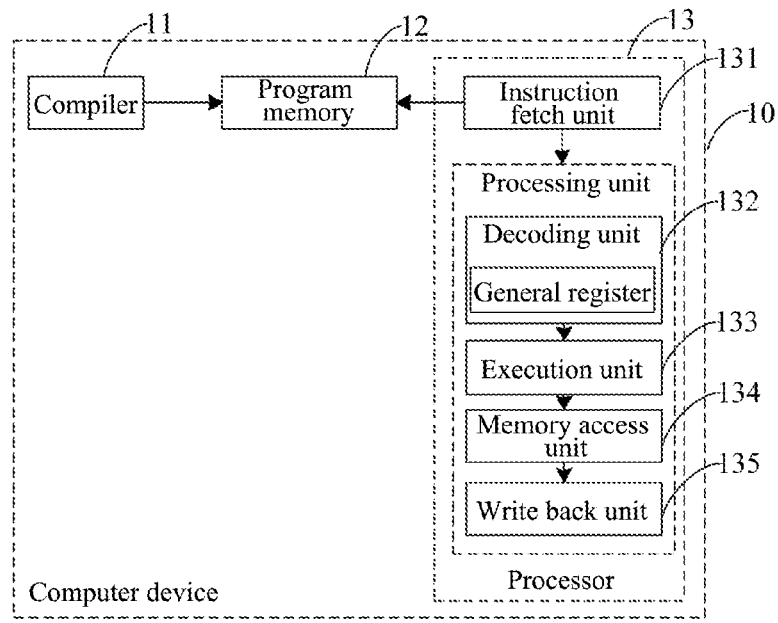
FIG. 1 is an architecture diagram of a computer device of the prior art.

FIG. 1 is an architecture diagram of a computer device in the prior art. As shown in FIG. 1, a computer device 10 includes: a compiler 11, a program memory 12 and a processor 13; where, the compiler 11 is a software program set on the computer device 10, and is configured to compile a program (hereinafter referred to as software code) written by a programmer in a high-level language into a machine language (hereinafter referred to as computer program) that can be executed by a computer; the program memory 12 is configured to store a computer program including a plurality of computer instructions; the processor 13 is configured to execute computer instructions.

In one example, the processor 13 may be a central processing unit (CPU). The central processing unit includes an instruction fetch unit 131, a decoding unit 132, an execution unit 133, a memory access unit 134 and a write back unit 135; where, the instruction fetch unit 131 is connected to the program memory 12, and the instruction fetch unit 131 is configured to acquire computer instructions from the program memory 12; the decoding unit 132 is configured to parse the computer instructions acquired by the instruction fetch unit 131 to acquire a control signal corresponding to the computer instructions; the execution unit 133 is configured to execute the control signal; the memory access unit 134 is configured to read an operand according to needs of the computer instructions, and the operand is configured to control a execution process of the signal; the write back unit 135 is configured to write a execution result back to a register inside the CPU.

The above is an execution process of one piece of computer instruction in the CPU. In this process, when the processor 13 encounters a loop statement, it usually puts the number of a loop into a general register, and then takes a loop instruction out of the program memory, and in each loop, the number of the loop in the general register will be reduced by one until the number of the loop in the general register is 0 and the loop ends. In this process, the processor needs to determine whether the number of the loop is 0 before executing the loop instruction, and then decide whether to continue to fetch a loop instruction. For the processor, it needs to not only make a determination but also fetch the loop instruction, which will undoubtedly cause a lot of overhead. Therefore, someone proposed to predict the number of the loop and determine the end of the loop according to the state of the program. For example, if the hardware detects that the program detects the same destination address several times in succession, it will be speculated that it is a loop, and the way of the speculation will lead to the problem of inaccurate prediction.

In view of the above technical problem, the present application makes a corresponding improvement on the compilation process of the compiler, compiling a statement that cannot be recognized by a hardware structure of a computer device, such as, for statement or while statement, into an instruction that can be recognized by the hardware structure of the computer, and then the hardware structure identifies loop parameters such as start address, end address and the number of the loop according to the compiled instruction, and since the compiled instruction can be recognized by the hardware structure, the hardware structure can directly determine the loop parameters such as the start address, the end address and the number of the loop according to the compiled instruction, and it is no longer necessary to infer the start address and the end address of loop and the number of the loop, according to the state of the program. In this way, the processor can accurately acquire the loop parameters, and then acquire the loop instruction according to the loop parameters.

The present application provides a processing method, device, equipment and storage medium of loop instructions, which are applied to voice and chip technologies in computer technologies, so as to achieve the effect of accurately acquiring the number of the loop, the start address and the end address of loop. The embodiments of the present application are applicable to scenarios that involve repeated operations on an array in the process of data processing. For example, in a scenario, of voice signal processing, it is often necessary to carry out digital signal processing on a voice data array, so such repeated operations, such as, for loop and while loop, will be used to traverse the array.

The technical solution of the present application and how the technical solution of the present application solves the above technical problems are described in detail with specific embodiments. The following specific embodiments can be combined with each other, and the same or similar concepts or processes may not be repeated in some embodiments. The following will describe the embodiments of the present application in combination with the drawings.

Figure 2:
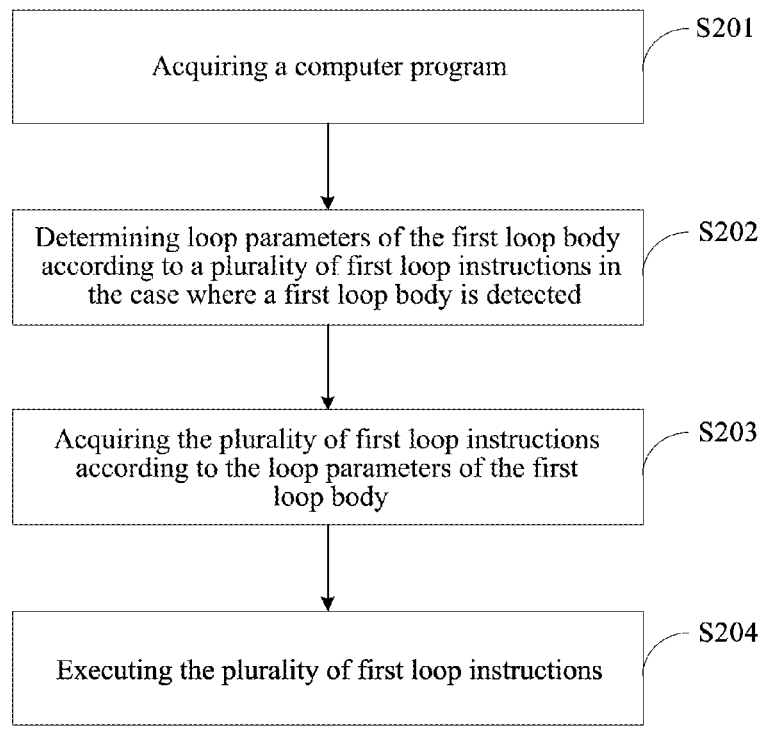
FIG. 2 is a flow chart of a processing method of cycle instructions provided by an embodiment of the present application.

FIG. 2 is a flow chart of a processing method of loop instructions provided by an embodiment of the present application. According to the above technical problems of the prior art, the embodiment of the present application provides a processing method of loop instructions, as shown in FIG. 2. the specific steps of the method are as follows:

Step S201, acquiring a computer program.

Where, the computer program includes a first loop body, the first loop body is generated according to a second loop body of a software code to be compiled, the first loop body includes a plurality of first loop instructions, and the plurality of first loop instructions are instructions that can be recognized by a hardware structure of a computer device.

Figure 3:
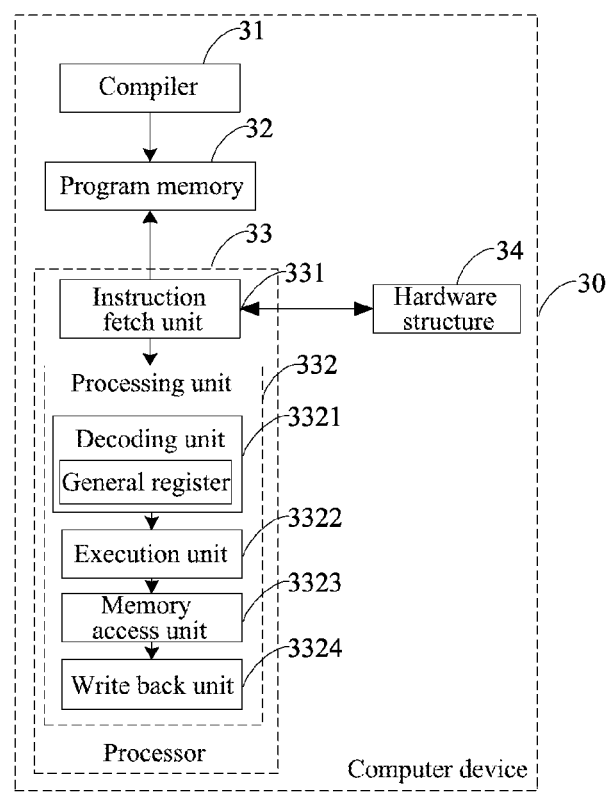
FIG. 3 is an architecture diagram of a computer device provided by an embodiment of the present application.

The processing method of the loop instructions provided by the embodiment of the application is applicable to the architecture diagram of the computer device shown in FIG. 3. As shown in FIG. 3, the computer device 30 includes a compiler 31, a program memory 32, a processor 33, and a hardware structure 34; where the compiler 31 is a software program set on the computer device 30, and the program memory 32, the processor 33, and the hardware structure 34 belong to hardware structures of the computer device. Compared with the computer device of FIG. 1, the structures and functions of the program memory 32 and the processor 33 in this embodiment are the same as the structures and functions of the program memory 12 and the processor 13 shown in FIG. 1. The differences are that the function of the compiler 31 is improved and the hardware structure 34 is added.

In this embodiment, the compiler 31 receives the software code written in a high-level language and compiles the software code into a language (computer program) that can be recognized by the computer device. The software code includes a second loop body, which is a loop language that cannot be recognized by the hardware structure of the computer device. The compiler 31 of this embodiment first compiles the second loop body in the software code into a loop language that can be recognized by the hardware structure.

After compiling by the compiler 31 to obtain the computer program, the computer program is stored in the program memory 32, and then the instruction fetch unit 331 in the processor 33 acquires the computer program from the program memory 32.

Step S202, determining loop parameters of the first loop body according to a plurality of first loop instructions in the case where the first loop body is detected.

When the hardware structure 34 detects the first loop body in the computer program, it will store some related parameters of the first loop body into the hardware structure, and then the hardware structure can determine the loop parameters of the first loop body according to the stored related parameters.

Step S203, acquiring a plurality of first loop instructions according to the loop parameters of the first loop body.

The instruction fetch unit 331 acquires the loop parameters of the first loop body from the hardware structure, and acquires the plurality of first loop instructions from the program memory according to the loop parameters of the first loop body.

Step S204, executing the plurality of first loop instructions.

In this step, the first loop instructions acquired by the instruction fetch unit 331 are sent to the processing unit 332, and the processing unit 332 executes the plurality of first loop instructions. Where, the processing unit 332 executes the plurality of first loop instructions, including: the decoding unit 3321 parses a computer instruction acquired by the instruction fetch unit 331 to acquire a control signal corresponding to the computer instruction; the memory access unit 3323 reads an operand used for an execution process of the control signal according to needs of the computer instruction, and sends it to the execution unit 3322 to cause the execution unit 3322 to execute the control signal according to the operand; the write back unit 3324 writes an execution result back to a general register in the processor.

Optionally, in the process of executing the plurality of first loop instructions, the processing unit 332 may execute the first loop instruction once every time it acquires one first loop instruction or it may acquire at least two first loop instructions and then execute at least two first loop instructions. The specific execution process can be determined according to actual needs, and the present embodiment does not have specific restrictions on this.

The embodiment of the present application involves acquiring a computer program, where the computer program includes a first loop body, the first loop body is generated according to a second loop body in a software code to be compiled, the first loop body includes a plurality of first loop instructions, and the plurality of first loop instructions are instructions that can be recognized by a hardware structure; when the first loop body is detected, determining loop parameters of the first loop body according to the plurality of first loop instructions; then, acquiring the plurality of first loop instructions according to the loop parameters of the first loop body; and executing the plurality of first loop instructions. Since the first loop body is a loop statement that is generated according to the second loop body of the software code to be compiled and that can be recognized by the hardware structure, the hardware structure can accurately determine the loop parameters of the loop directly according to the first loop body, and it is no longer necessary to infer the loop parameters according to the second loop body, thus avoiding the problem of inaccurate prediction. In addition, the present application completes the determination process of the loop parameters by the hardware structure, and the processor does not need to determine a loop end condition and other operations. Therefore, for the processor, the loop parameters can be accurately acquired in the process of realizing zero overhead loops to ensure a normal operation of the program.

Figure 4:
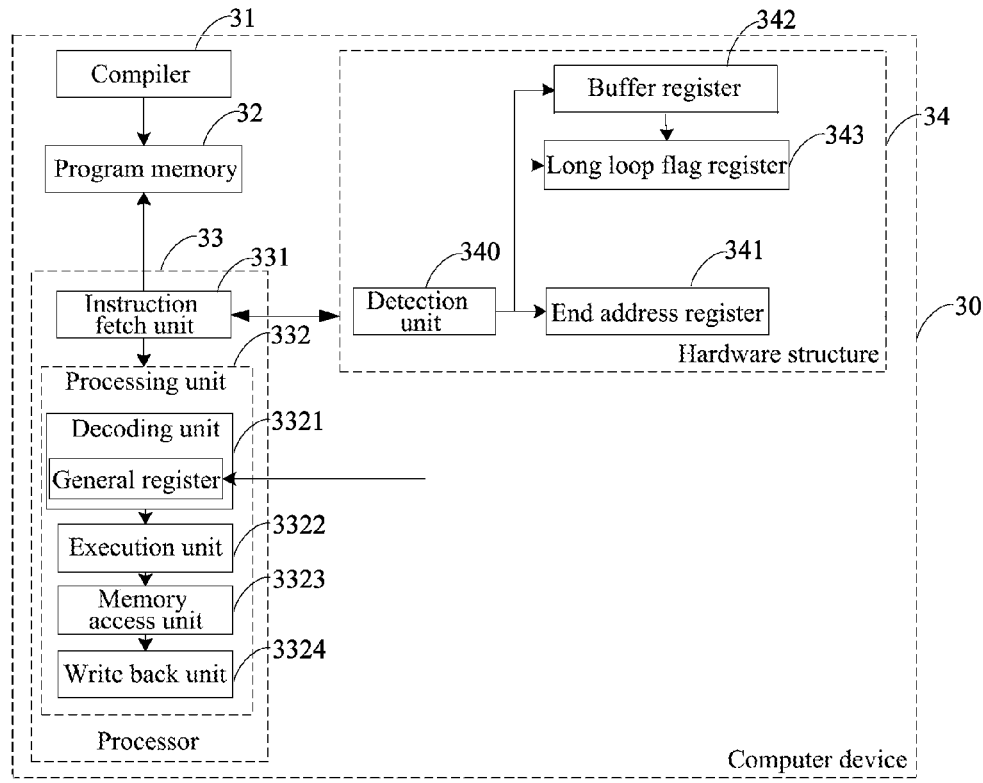
FIG. 4 is an architecture diagram of a computer device provided by another embodiment of the application.

FIG. 4 is an architecture diagram of a computer device suitable for another embodiment of the present application. As shown in FIG. 4, on the basis of FIG. 3, the hardware structure 34 includes a detection unit 340, an end address register 341, a buffer register 342 and a long loop flag register 343, where the end address register 341 is configured to store an end address of the first loop instructions in the first loop body, the buffer register 342 is configured to store the first loop instructions in the first loop body and the long loop flag register 343 is configured to identify the first loop body is a long loop or a short loop. Where, the long loop refers to that the number of the first loop instructions included in the first loop body is greater than a depth (total storage space of the buffer register 342) of the buffer register 342, and the short loop refers to that the number of the first loop instructions included in the first loop body is less than or equal to the depth (the total storage space of the buffer register 342) of the buffer register 342, where the depth of the buffer register can be understood as a maximum number of instructions that the buffer register can store.

Where, the computer program includes a plurality of computer instructions, the loop parameters include the end address of the loop and the number of the loop, the number of the loop is recorded as N, and N is an integer greater than 0; the number of the loop is determined according to the first loop body, that is, after compiling by the compiler according to the second loop body to obtain the first loop body, the number of the loop can be acquired, and then the number of the loop will be stored in the general register of the computer device.

On the basis of FIG. 4, when the first loop body is detected, the determining the loop parameters of the first loop body according to the plurality of first loop instructions, includes:

Step a1, if it is detected that the computer instruction is the first loop instruction, and the remaining storage space of the buffer register is not 0, storing the computer instruction into the buffer register, storing an address corresponding to the computer instruction into the end address register, and setting a flag bit of the long loop flag register to be as a short loop identifier, the short loop identifier being configured to identify that the storage space occupied by the first loop instructions currently stored in the buffer register is less than or equal to the total storage space of the buffer register.

Step a2, determining the end address of the loop according to the end address stored in the end address register.

In this embodiment, the computer program is stored, in the program memory, as computer instructions one by one, and has corresponding storage addresses in the program memory. A specific form can be seen in the following Table 1:

| Storage address | Computer program |
| --- | --- |
| Storage address 1 | Computer instruction 1 |
| Storage address 2 | Computer instruction 2 |
| ... | ... |
| Storage address n | Computer instruction n |

Where n is an integer greater than 0.

Figure 5:
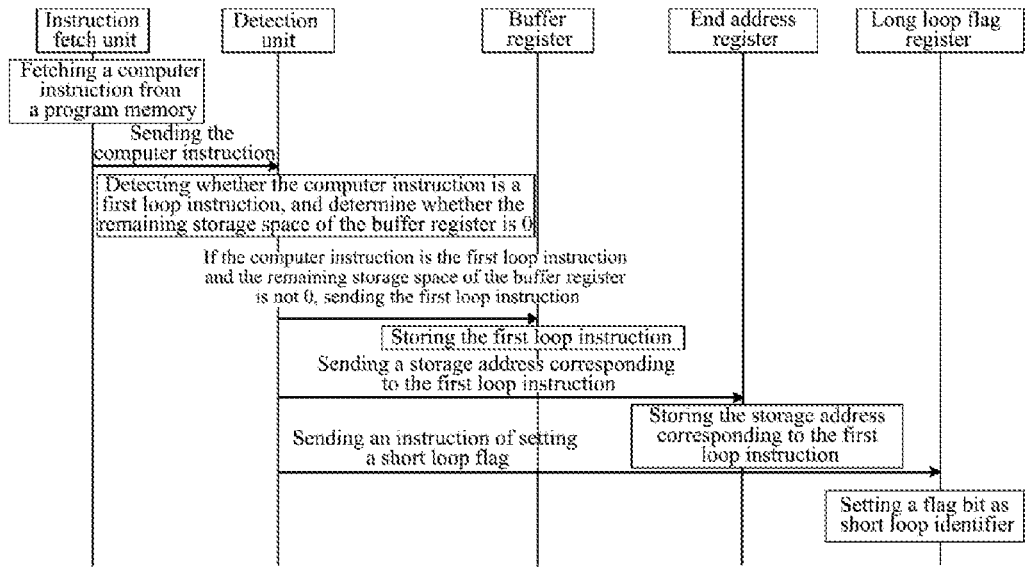
FIG. 5 is a signaling diagram of a processing method of cycle instructions provided by an embodiment of the present application.

Exemplarily, as shown in FIG. 5, the instruction fetch unit fetches one computer instruction from the program memory each time, and sends the computer instruction to the detection unit, the detection unit will detect whether the computer instruction is a first loop instruction and confirm whether the remaining storage space of the buffer register is 0. If the computer instruction is detected as the first loop instruction and the remaining storage space of the buffer register is not 0, then the detected first loop instruction is directly stored in the buffer register. Where, the first loop instruction also has a corresponding cache address in the buffer register, and a specific forms can be seen in the following Table 2:

| Cache address | First loop instruction |
|---|---|
| Cache address 1 | First loop instruction 1 |
| Cache address 2 | First loop instruction 2 |
| ... | ... |
| Cache address m | First loop instruction m |

Where m is an integer less than or equal to n.

After storing by the detection unit the detected first loop instruction into the buffer register, the detection unit also needs to store the storage address corresponding to the first loop instruction into the end address register, and set the flag bit of the long loop flag register to be as a short loop identifier. The short loop identifier is configured to identify that the storage space occupied by the first loop instructions currently stored in the buffer register is less than or equal to the total storage space in the buffer register.

Figure 6:
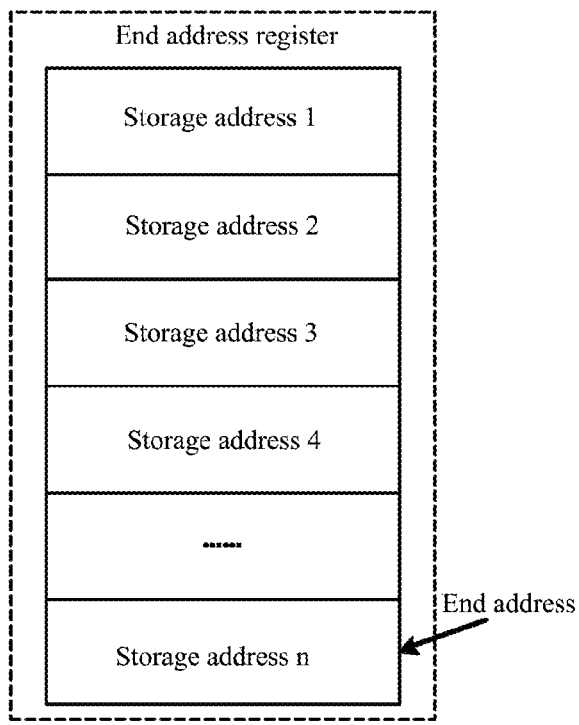
FIG. 6 is a schematic diagram for storing an end address in an end address register provided by an embodiment of the application.

Optionally, the detection unit storing the storage address corresponding to the computer instruction into the end address register including the following two implementation modes:

In an optional embodiment, as shown in FIG. 6, the storage address corresponding to each first loop instruction is stored in the end address register in the order of instruction fetching. In this way, after all the computer instructions are acquired and detected, the storage address of the last first loop instruction recorded in the end address register is the end address.

Figure 7:
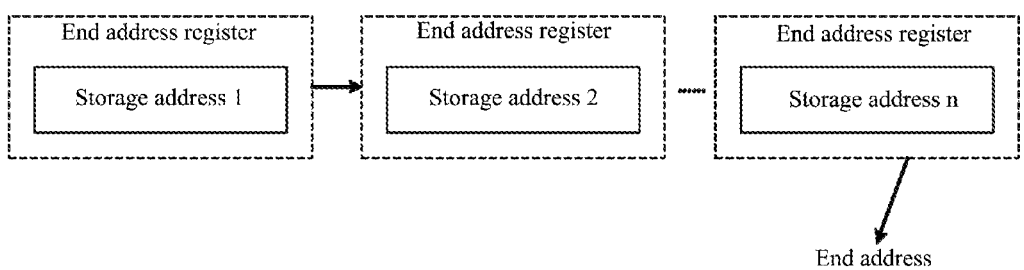
FIG. 7 is a schematic diagram for storing an end address in an end address register provided by another embodiment of the application.

In another optional embodiment, as shown in FIG. 7, each time the first loop instruction is detected, the storage address of the first loop instruction currently detected is used to overwrite the storage address previously recorded. It can be seen that the end address is always saved in the end address register, so that the storage space of the end address register can be saved, and the search time can be shortened and the search efficiency can be improved in the process of searching the end address later.

In an optional embodiment, detecting whether the computer instruction is a first loop instruction includes: detecting whether the computer instruction is a first loop instruction according to a programming characteristic of the first loop instruction. For example, if the first loop instruction is a loop loop instruction, it is detected whether the computer instruction includes a code of the loop instruction. If the computer instruction includes the code of the loop instruction, it is determined that the computer instruction is a first loop instruction. If the computer instruction does not include the code of the loop instruction, it is determined that the computer instruction is not a first loop instruction. Where, the code of the loop instruction is a predetermined binary code, for example, if the loop instruction is "10101" after being compiled into a binary code, the detection unit detects "10101" and considers the computer instruction to be the loop instruction. It should be understood that the binary code "10101" here is only an illustrative description, and form and length of the code of the loop instruction are not limited.

On the basis of the embodiment shown in FIG. 4, the acquiring the plurality of first loop instructions according to the loop parameters of the first loop body, can include the following two implementations:

in a first optional implementation, if the flag bit of the long loop flag register is the short loop flag, the operation of acquiring all the first loop instructions from the buffer register is performed N times. Exemplarily, the instruction fetch unit performs N operations for fetching all the first loop instructions from the buffer register.

In a second optional implementation, if it is detected that the computer instruction is the first loop instruction, the method of this embodiment further includes: executing the first loop instruction; acquiring a plurality of first loop instructions according to the loop parameters of the first loop body, including: if the flag bit of the long loop flag register is the short loop identifier, the operation of fetching all the first loop instructions from the buffer register are performed N−1 times.

In the second optional implementation, the first loop instruction is processed correspondingly while executing step a1. As such, step a1 is equivalent to first round of loop. During the first round of loop, the instruction fetch unit acquires the first loop instruction from the program memory, and not only sends the first loop instruction to the processing unit for processing, but also sends the first loop instruction to the hardware structure to determine the loop parameters. Therefore, it can save one loop period and reduce the power consumption of the processor.

Where, if the flag bit of the long loop flag register is the short loop identifier, it means that the cache space required by all the first loop instructions in the computer program is less than the total storage space of the buffer register, that is to say, all the first loop instructions in the computer program can be stored in the buffer register. Then the instruction fetch unit can directly acquire the first loop instructions one by one from the buffer register. After one round of acquiring all the first loop instructions, the number of the loop N will be reduced by one until the number of the loop is 0 to acquire all the first loop instructions N times. Where, with regard to counting of the number of the loop, it is possible to perform an operation of subtracting one for every time all the first loop instructions are acquired, until the number of the loop is 0, or it is possible to perform an operation of adding one for every time all the first loop instructions are acquired, until the number of the loop reaches N.

Optionally, the short loop identifier and the long loop identifier can be identified by 0 and 1, that is, if the flag position bit of the long loop flag register is 0, it means that the first loop body is a short loop. If the flag position bit of the long loop identification register is 1, it means that the first loop body is a long loop. It should be understood that the adoptions of 0 and 1 identifiers for short loop identifier and long loop identifier are only an exemplary description, and does not specifically limit the present application.

Figure 8:
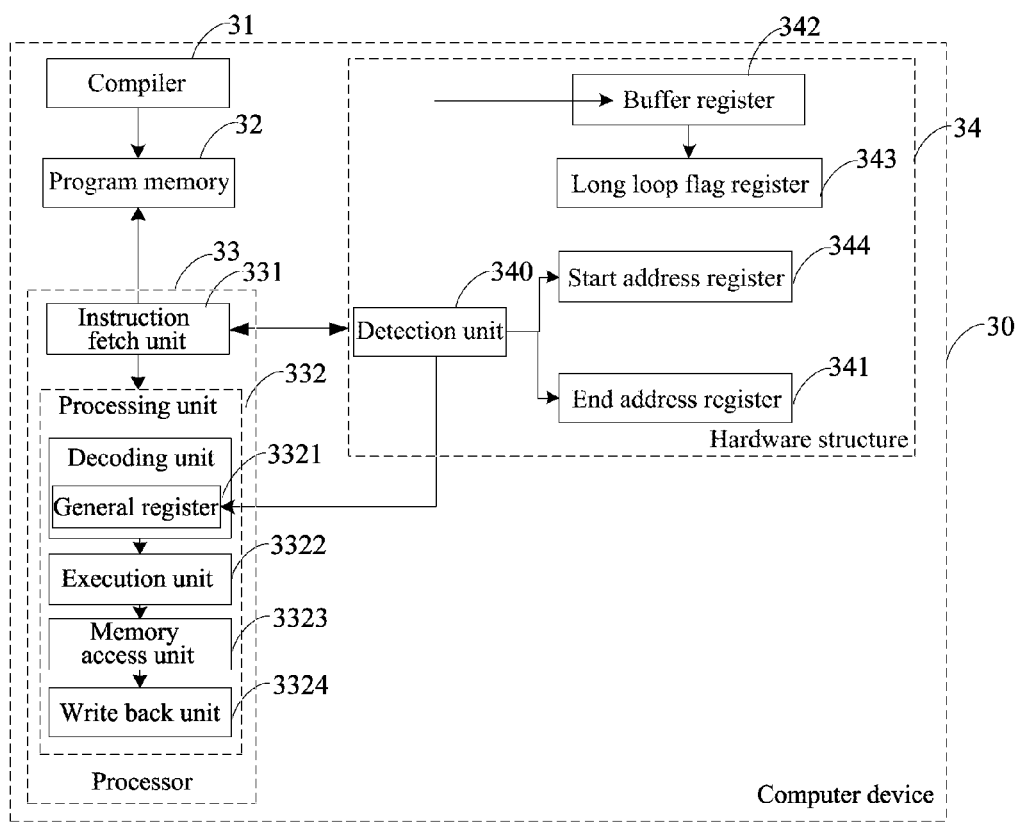
FIG. 8 is an architecture diagram of a computer device provided by another embodiment of the application.

FIG. 8 is an architecture diagram of a computer device provided by another embodiment of the present application. As shown in FIG. 8, on the basis of FIG. 4, the hardware structure 34 further includes a start address register 344. When the first loop body is detected, the determining the loop parameters of the first loop body according to the plurality of first loop instructions, includes:

Step b: if it is detected that the computer instruction is a first loop instruction and the remaining storage space of the buffer register is 0, then the address corresponding to the computer instruction is stored in the start address register, and the flag bit of the long loop flag register is set as the long loop identifier; and when the computer instruction acquired later is the first loop instruction, the address corresponding to the computer instruction acquired later is stored in the end address register, until all computer instructions are acquired. Where, the long loop identifier is configured to identify that the storage space occupied by the first loop instructions currently stored in the buffer register is greater than the total storage space of the buffer register.

In this embodiment, the address recorded in the start address register is the storage address of the first loop instruction acquired from the program memory. For example, if the computer program includes n first loop instructions, and the maximum storage space of the buffer register is storing m first loop instructions, where n is greater than m, then after detecting (m+1)th first loop instruction, since the storage space of the buffer register is full, this embodiment stores the storage address of the (m+1)th first loop instruction into the start address register.

In this embodiment, when the storage space required by the first loop instructions included in the computer program is larger than the total storage space of the buffer register, a first loop instruction fetched out is preferentially stored in the buffer register. After the buffer register is full, the storage address of the first loop instruction fetched out later is recorded, and the start address and end address of the instruction to be fetched from the program memory are determined according to the recorded storage address. Then, in the process of acquiring the first loop instructions, the first loop instruction stored in the buffer register can be acquired first, and then the remaining first loop instructions can be acquired from the program memory according to the recorded start address and the recorded end address. For long loop, this can reduce a part of power consumption of the processors due to reduction of the number of interactions between the processor and the program memory.

On the basis of the embodiment shown in FIG. 8, the acquiring the plurality of first loop instructions according to the loop parameters of the first loop body still has two different implementations as follows:

In a first optional implementation, the acquiring the plurality of first loop instructions according to the loop parameters of the first loop body, includes: if the flag bit of the long loop flag register is a long loop identifier, performing the operation of acquiring all the first loop instructions from the buffer register for N times; and performing the operation of acquiring corresponding first loop instructions from the program memory of the computer device starting from the start address recorded in the start register until acquiring the first loop instruction corresponding to the end address, for N times.

In a second optional implementation, if it is detected that the computer instruction is a first loop instruction, the method of this embodiment further includes: executing the first loop instruction;

Where, the acquiring the plurality of first loop instructions according to the loop parameters of the first loop body, includes: if the flag bit of the long loop flag register is a long loop identifier, performing the operation of acquiring all the first loop instructions from the buffer register for N−1 times; and performing the operation of acquiring corresponding first loop instructions from the program memory of the computer device starting from the start address recorded in the start register until acquiring the first loop instruction corresponding to the end address, for N−1 times.

In the second optional implementation, the first loop instruction is processed while step B is executed. As such, step B is equivalent to the first round of loop. In process of the first round of loop, the instruction fetch unit acquires the first loop instructions from the program memory, and not only sends the first loop instructions to the processing unit for processing, but also sends the first loop instructions to the hardware structure to determine the loop parameters. Therefore, one loop can be saved and the power consumption of the processor can be reduced.

In the process of acquiring the first loop instructions, the first loop instruction stored in the buffer register is acquired first, and then the remaining first loop instructions are acquired from the program memory according to the recorded start address and the recorded end address. For long loop, this can reduce a part of power consumption of processors due to reduction of the number of interactions between the processor and the program memory.

Figure 9:
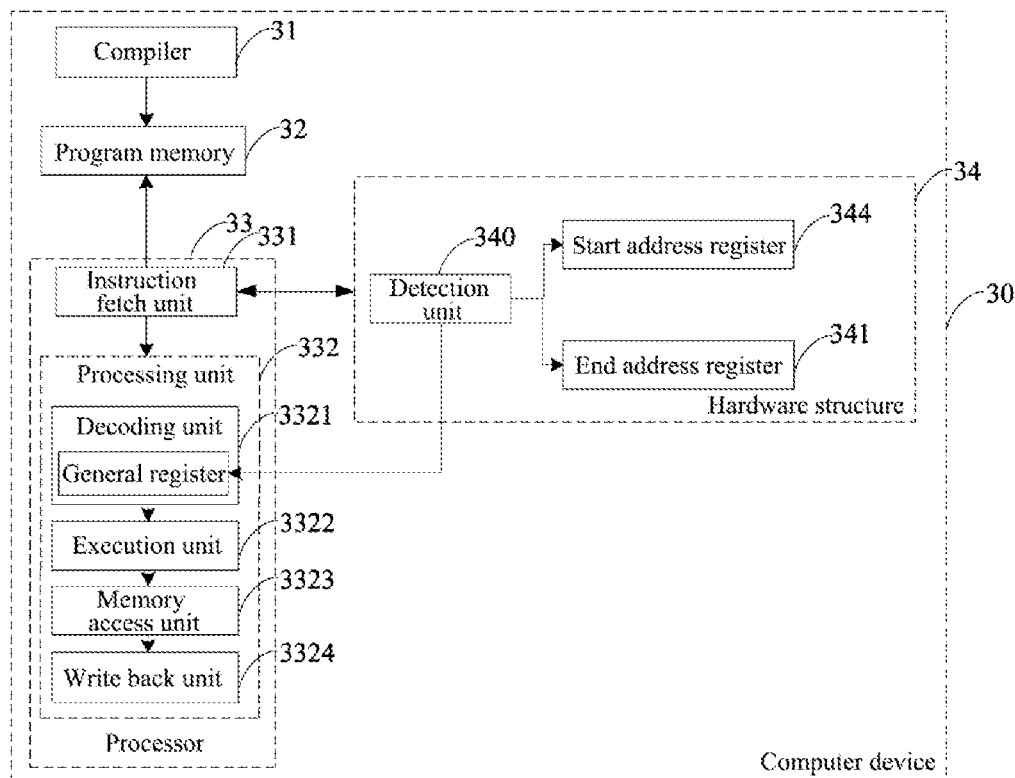
FIG. 9 is an architecture diagram of a computer device provided by another embodiment of the present application.

FIG. 9 is an architecture diagram of a computer device provided by another embodiment of the present application. As shown in FIG. 9, on the basis of FIG. 3, the hardware structure 34 includes a start address register 341 and an end address register 344. Then the determining the loop parameters of the first loop body according to the plurality of first loop instructions in the case where the first loop body is detected, includes:

Step c1, if it is the first time that the computer instruction is detected as a first loop instruction, an address corresponding to the currently acquired computer instruction is stored in the start address register.

Step c2, if it is not the first time that the computer instruction is detected as the first loop instruction, the address corresponding to the currently acquired computer instruction is stored in the end address register until all the computer instructions are acquired, where an address corresponding to the detected first loop instruction for the last time is the end address.

Step c3, storing the number of a loop included in the first loop body into a general register.

The difference between this embodiment and the embodiments shown in FIG. 4 and FIG. 5 is that the hardware structure of this embodiment does not include the buffer register, and this embodiment uses the start address register to record the storage address of the first piece of first loop instruction in the program memory, and uses the end address register to record the storage address of the last piece of first loop instruction in the program memory. Compared with the embodiments shown in FIG. 4 and FIG. 5, this embodiment has advantages of simplifying the hardware structure and reducing the hardware overhead.

On the basis of the embodiment shown in FIG. 9, the acquiring the plurality of first loop instructions according to the loop parameters of the first loop body still has two different implementations as follows:

In a first optional implementation, the acquiring the plurality of first loop instructions according to the loop parameters of the first loop body, includes: performing the operation of acquiring corresponding first loop instructions from the program memory of the computer device starting from the start address recorded in the start register until acquiring the first loop instruction corresponding to the end address, for N times.

In a second optional embodiment, the first loop instruction is executed every time a first loop instruction is detected in step c1 and step c2, then the acquiring the plurality of first loop instructions according to the loop parameters of the first loop body, includes: performing the operation of acquiring corresponding first loop instructions from the program memory of the computer device starting from the start address recorded in the start register until acquiring the first loop instruction corresponding to the end address, for N−1 times.

For example, if the storage address of the first loop instructions in the program memory is as follows:

| Storage address | First loop instruction |
|---|---|
| Storage address x | First loop instruction 1 |
| Storage address x + 1 | First loop instruction 2 |
| ... | ... |
| Storage address x + m − 1 | First loop instruction m | then in this embodiment, the start address recorded in the start address register is the storage address x, and the end address is the storage address x+m−1, then the instruction fetch unit will fetch out, starting from the storage address x, all the first loop instructions (first loop instruction 1 to first loop instruction m) between the storage address x to the storage address x+m−1 one by one, and every time the operation of fetching out, starting from the storage address x, all the first loop instructions between the storage address x to the storage address x+m−1 one by one is executed, the number of the loop will be reduced by one. When the number of the loop is reduced to 0, it means the instruction fetching of the loop operation is ended. Alternatively, the number of the loop is increased by one, and when the count of the number of the loop reaches the total number of the loop included in the first loop body, the instruction fetching of the loop operation ends.

In an optional example, the first loop body can be a loop loop body, the second loop body can be a for loop body, a while loop body, the for loop body is a loop body including a for loop statement, the while loop body is a loop body including a while loop statement, and the loop loop body is a loop body including a loop loop statement. It should be understood that the first loop body is the loop loop body, and the second loop body is the for loop body or the while loop body. This is only a illustrative description, and the specific forms of the first loop body and the second loop body are not limited here, as long as they can convert an instruction that cannot be recognized by the hardware device of the computer device into an instruction that can be recognized by the computer device, and they are all within the scope of the present application.

Optionally, the first loop body includes a pair of loop loop instructions, the pair of loop loop instructions are respectively used to indicate the start and end of the loop loop. For example, the for statement is written as: for (i=0; i<LOOP_NUM; i++), where i represents a variable, loop_Num represents the total number of loop. After compiling the above for statement in this embodiment, the following computer program can be acquired:

| mov GPRn, | LOOP_NUM. //store loop number |
|---|---|
| LOOP | //loop start |
| LOOP_OP1. | //first loop instruction |
| LOOP_OP2 | |
| ... | |
| LOOP_OPn | //last loop instruction |
| LOOP | //loop end |
| NORMAL_OP. | //normal operations after loop |

In the above computer program, mov GPRn, LOOP_NUM represents storing the number of loop LOOP_NUM into the general registerGPRn; in the pair of LOOP instructions, the first LOOP represents the start of the LOOP loop (loop start) and the second LOOP represents the end of the LOOP loop (last loop instruction); LOOP_OP1, LOOP_OP2, . . . LOOP_OPn are first loop instructions, where LOOP_OP1 is the first piece of loop instruction in the loop loop (first loop instruction), LOOP_OPn is the last piece of loop instruction in the loop loop (last loop instruction), and LOOP_OP1, LOOP_OP2, . . . LOOP_OPn correspond to programs to be processed by the for loop statement. NORMAL OP is a normal operation after LOOP loop.

Compared with the prior art where two LOOP instructions are needed to realize identifications of the start and end of the LOOP loop, that is, LOOP START is used to identify the start of the LOOP loop, and LOOP END is used to identify the end of the LOOP loop, this embodiment realizes the identifications of the start and end of the LOOP loop through a pair of LOOP instructions, which can save one instruction code. In addition, after the first round of loop, the instruction fetch unit only needs to directly acquire the LOOP_OP1, LOOP_OP2, . . . LOOP_OPn and other first loop instructions, and there is no need to read the pair of LOOP instructions in the program, which can save processing time.

In an optional example, the number of the loop in the above embodiment can be stored in a general register or a loop number counter. In an implementation of storing the number of the loop in the loop number counter, the number of the loop can be directly stored in the loop number counter, or the number of the loop stored in the general register can be assigned to the loop number counter. Compared with storing the number of the loop in the general register, storing the number of the loop in the loop number counter will result in a relatively simple instruction format of the compiler, the compiler does not need to specify which register to place the number of the loop. In addition, because the general register may be used by each instruction, if the general register is occupied, one available register will be reduced, which may affect the execution of other computer instructions. In addition, the loop number counter itself can count, and if the general register is used, each register needs to have a counting function, which requires a large additional hardware overhead. Therefore, storing the number of the loop in the loop number counter not only simplifies the instruction format of the compiler, but also does not occupy the general register and does not affect the execution of other computer instructions. In addition, it can reduce the additional hardware overhead.

Where, assigning the number of the loop stored in the general register to the loop number counter is acquiring the number of the loop from the general register and assigning the number of the loop to the loop number counter, in the case where the first loop instruction is detected for the first time by the instruction fetch unit.

Please continue to refer to FIG. 3. The embodiment of the present application further provides a processing device for loop instructions, including an instruction fetch unit 331, a hardware structure 34, and a processing unit 332; where, the instruction fetch unit 331 is configured to acquire a computer program, and the computer program includes a first loop body that is generated according to a second loop in a software code to be compiled, the first loop body includes a plurality of first loop instructions, the plurality of first loop instructions are instructions that can be recognized by the hardware structure of the computer device; the hardware structure 34 is configured to determine the loop parameters of the first loop body according to the plurality of first loop instructions, in the case where the first loop body is detected; the instruction fetch unit 331 is further configured to acquire the plurality of first loop instructions according to the loop parameters of the first loop body; and the processing unit 332 is configured to execute the plurality of first loop instructions.

Where, the computer program includes a plurality of computer instructions; the loop parameters include the end address of loop and the number of the loop N, N is a positive integer greater than or equal to 0, and the number of the loop is determined according to the first loop body; please continue to refer to FIG. 4, the hardware structure 34 includes a detection unit 340, an end address register 341, a buffer register 342, and a long loop flag register 343; the detection unit 340 is configured to detect whether a computer instruction is a first loop instruction, and in the case where it is detected that the computer instruction is the first loop instruction, and the remaining storage space of the buffer register is not 0, the computer instruction is sent to the buffer register, an address corresponding to the computer instruction is sent to the end address register, and an instruction setting a short loop identifier is sent to the long loop flag register. The short loop identifier is configured to identify that the storage space occupied by the first loop instructions currently stored in the buffer register is less than or equal to the total storage space of the buffer register; the buffer register 342 is configured to store computer instructions; the end address register 341 is configured to store addresses corresponding to the computer instructions; the long loop flag register 342 is configured to set the flag bit of the long loop flag register to be as the short loop identifier, and the instruction fetch unit 331 is further configured to determine the end address of the loop according to the end address stored in the end address register.

Continue to refer to FIG. 8, the hardware structure 34 further includes a start address register 344; and the detection unit 340 is further configured to send the address corresponding to the computer instruction to the start address register and send the instruction setting the long loop identifier to the long loop flag register, in the case where it is detected that the computer instruction is the first loop instruction and the remaining storage space of the buffer register is 0; the long loop identifier is configured to identify that the storage space occupied by the first loop instructions currently stored in the buffer register is greater than the total storage space of the buffer register; the start address register 344 is configured to store the address corresponding to the computer instruction; the long loop flag register 343 is configured to set the flag bit of the long loop flag register to be as the long loop identifier; the detection unit 340 is further configured to send the address corresponding to the computer instruction acquired later to the end address register in the case where the computer instruction acquired later is the first loop instruction, until all the computer instructions are acquired; the end address register 341 is further configured to store addresses corresponding to computer instructions acquired later.

Optionally, the instruction fetch unit 331 is further configured to perform the operation of acquiring all the first loop instructions from the buffer register N times if the flag bit of the long loop flag register is the short loop identifier.

Optionally, the processing unit 332 is further configured to perform the first loop instruction if it is detected that the computer instruction is the first loop instruction; the instruction fetch unit 331 is further configured to perform the operation of acquiring all the first loop instructions from the buffer register N−1 times if the flag bit of the long loop flag register is the short loop identifier.

Optionally, the instruction fetch unit 331 is further configured to perform the operation of acquiring all the first loop instructions from the buffer register N times if the flag bit of the long loop flag register is the long loop identifier; and perform the operation of acquiring corresponding first loop instructions from the program memory of the computer device starting from the start address recorded in the start register for N times until the first loop instruction corresponding to the end address is acquired.

Optionally, the processing unit 332 is further configured to execute the first loop instruction if it is detected that the computer instruction is the first loop instruction; the instruction fetch unit 331 is further configured to: if the flag bit of the long loop flag register is the long loop identifier, perform the operation of acquiring all the first loop instructions from the buffer register for N−1 times; and perform the operation of acquiring corresponding first loop instructions from the program memory of the computer device starting from the start address recorded in the start register until acquiring the first loop instruction corresponding to the end address, for N−1 times.

Optionally, the computer program includes a plurality of computer instructions; the loop parameters include the start address and the end address of loop and the number of the loop, the number of the loop is N, N is an integer greater than 0, and the number of the loop is determined according to the first loop body; please continue to refer to FIG. 9, the hardware structure includes the start address register 344 and the end address register 341; the detection unit 340 is further configured to send the address corresponding to the computer instruction to the start address register if it the first time that the computer instruction is detected as the first loop instruction; and to send the address corresponding to the computer instruction to the end address register until all the computer instructions are acquired, if it is not the first time that the computer instruction is detected as the first loop instruction, where, the last detected address corresponding to the first loop instruction is the end address; the start address register 344 is configured to take the address corresponding to the computer instruction as the start address of the loop and store it; the end address register 341 is configured to take the address corresponding to the computer instruction as the end address of the loop and store it.

Optionally, the instruction fetch unit 331 is further configured to perform the operation of acquiring the corresponding first loop instruction from the program memory of the computer device starting from the start address recorded in the start register until acquiring the first loop instruction corresponding to the end address, for N times.

Optionally, the processing unit 332 is further configured to execute the first loop instruction detected each time; the instruction fetch unit 331 is further configured to perform the operation of acquiring the corresponding first loop instruction from the program memory of the computer device starting from the start address recorded in the start register until acquiring the first loop instruction corresponding to the end address, for N−1 times.

Optionally, the first loop instruction includes a loop loop instruction, and the second loop instruction includes a for loop instruction.

Optionally, the first loop body includes a pair of loop loop instructions, the pair of loop loop instructions are respectively used to indicate the start and end of the loop loop.

Optionally, the computer device further includes: a general register for storing the number of the loop.

Optionally, the hardware structure 34 further includes: a loop number counter (not shown in the figure); the detection unit 340 is further configured to acquire the number of the loop from the general register and send it to the loop number counter; the loop number counter is configured to store the number of the loop, and reduce the number of the loop by one every time the instruction fetch unit acquires all the first loop instructions in the first loop body.

A processing device of loop instruction provided by the embodiment of the present application can be used to implement the technical solution of the above method embodiment, and has similar implementation principle and technical effect to the later, and thus will not be repeated here.

According to an embodiment of the present application, the present application further provides an electronic equipment and a readable storage medium.

Figure 10:
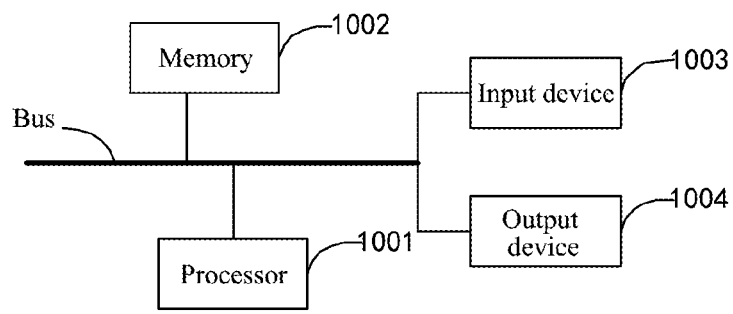
FIG. 10 is a block diagram of an electronic equipment for realizing a processing method of cycle instructions in an embodiment of the present application.

As shown in FIG. 10, it is a block diagram of an electronic equipment of a processing method of loop instructions according to an embodiment of the present application. The electronic equipment is designed to represent various forms of digital computers, such as laptop computers, desktop computers, workstations, personal digital assistants, servers, blade servers, mainframe computers, and other suitable computers. The electronic devices can also represent various forms of mobile devices, such as personal digital processing, cellular phones, smart phones, wearable devices and other similar computing devices. The components shown herein, their connections and relationships, and their functions are only examples and are not intended to limit the implementation of the present application described and/or claimed herein.

As shown in FIG. 10, the electronic equipment includes one or more processors 1001, a memory 1002, and interfaces for connecting various components, including high-speed interface and low-speed interface. The components are connected to each other by different buses, and can be installed on a common motherboard or in other ways as needed. The processors may process instructions executed within the electronic equipment, including instructions stored in or on the memory to display graphical information of a graphical user interface (GUI) on an external input/output device (such as a display device coupled to an interface). In other embodiments, if necessary, multiple processors and/or multiple buses may be used together with multiple memories. Similarly, multiple electronic equipments can be connected, each of the device provides part of necessary operations (for example, as a server array, a set of blade servers, or a multi-processor system). In FIG. 10, a processor 1001 is taken as an example.

The memory 1002 is a non-instantaneous computer-readable storage medium provided by the present application. Where the memory stores instructions that can be executed by at least one processor to enable the at least one processor to execute the processing method of loop instructions provided by the present application. The non-instantaneous computer-readable storage medium of the present application stores computer instructions for causing the computer to execute the processing method of the loop instructions provided by the present application.

As a non-instantaneous computer readable storage medium, the memory 1002 can be used to store non instantaneous software programs, non-instantaneous computer executable programs, modules and units, such as program instructions/modules and units corresponding to the processing method of loop instructions in the embodiments of the present application (for example, the detection unit 340, the end address register 341, the buffer register 341, the long loop flag register 343 and the start address register 344 shown in FIG. 4 and FIG. 8). The processors 1001 execute various function applications and data processing of the server by running non-instantaneous software programs, instructions and modules stored in the memory 1002, that is, implement the processing method of the loop instructions in the above method embodiment.

The memory 1002 may include a storage program area and a storage data area, where the storage program area may store an application program required by an operating system and at least one function, and the storage data area may store data created according to the use of the electronic equipment for the processing method of the loop instructions, etc. In addition, the memory 1002 may include a high-speed random-access memory, and may also include a non-instantaneous memory, such as at least one disk storage device, a flash memory device, or other non-instantaneous solid-state storage device. In some embodiments, the memory 1002 may optionally include a memory set remotely relative to the processors 1001; the remote memory may be connected via a network to the electronic equipment for executing the processing method of the loop instructions. Examples of the above network include but are not limited to the Internet, intranet, local area network, mobile communication network and combinations thereof.

The electronic equipment for the processing method of the loop instructions may further include an input device 1003 and an output device 1004. The processors 1001, the memory 1002, the input device 1003 and the output device 1004 may be connected by a bus or other means. In FIG. 10, the connection by a bus is taken as an example.

The input device 1003 can receive the input number or character information, and generate the key signal input related to the user setting and function control of the electronic equipment of the processing method of the loop instructions, such as a touch screen, a keypad, a mouse, a track pad, a touchpad, an indicator bar, one or more mouse buttons, a trackball, a joystick and other input device. The output device 1004 may include a display device, an auxiliary lighting device (for example, an LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuit systems, integrated circuit systems, specific ASICs (application specific integrated circuits), computer hardware, firmware, software, and/or combinations thereof. These various embodiments may include: implementing in one or more computer programs, where the one or more computer programs may be executed and/or interpreted on a programmable system including at least one programmable processor, the programmable processor may be a dedicated or general programmable processor, may receive data and instructions from a storage system, at least one input device, and at least one output device, and transmit the data and instructions to the storage system, the at least one input device, and the at least one output device.

These computer programs (also known as programs, software, software applications, or codes) include machine instructions of the programmable processor and can be implemented using high-level procedures and/or object-oriented programming languages, and/or assembly/machine languages. As used herein, the terms "machine-readable medium" and "computer-readable medium" refer to any computer program product, device, and/or equipment (e.g., magnetic disk, optical disk, memory, programmable logic device (PLD)) for providing machine instructions and/or data to the programmable processor, and include a machine-readable medium for receiving machine instructions as machine-readable signals. The term "machine-readable signals" refer to any signal for providing the machine instructions and/or data to the programmable processor.

In order to provide an interaction with a user, the systems and techniques described herein can be implemented on a computer that has: a display device for displaying information to the user (for example, a CRT (cathode ray tube) or LCD (liquid crystal display) monitor)); and a keyboard and a pointing device (for example, a mouse or a trackball) through which the user can provide an input to the computer. Other types of devices can also be used to provide the interaction with the user; for example, the feedback provided to the user can be any form of sensory feedback (for example, visual feedback, auditory feedback, or tactile feedback); and the input from the user can be received in any form (including an acoustic input, an voice input, or a tactile input).

The systems and techniques described herein may be implemented in a computing system including back-end components (e.g., as a data server), or a computing system including middleware components (e.g., an application server), or a computing system including front-end components (for example, a user computer having a graphical user interface or a web browser through which a user can interact with the implementations of the systems and technologies described herein), or a computing system including any combination of such back-end components, middleware components, or front-end components. The components of the system can be interconnected by digital data communication (e.g., communication network) in any form or medium. Examples of communication networks include: local area network (LAN), wide area network (WAN), and Internet.

A computer system may include a client and a server. The client and the server are usually far away from each other and interact with each other through a communication network. The relationship between the client and the server is generated by computer programs running on corresponding computers and having client-server relationship with each other. The server can be a cloud server, also known as cloud computing server or cloud host, and it is a host product in the cloud computing service system, solving the defects of difficult management and weak business scalability existed in traditional physical host and VPS (Virtual Private Server, or VPS for short).

It should be understood that various forms of processes shown above can be used to reorder, add, or delete steps. For example, the steps recorded in the present application can be performed in parallel, in sequence, or in a different order, as long as the expected results of the technical solution disclosed in the present application can be achieved, and there is no restriction herein.

The above specific embodiments do not constitute a restriction on the protection scope of the present application. It should be understood by those skilled in the art that various modifications, combinations, sub-combinations and substitutions can be made according to the design requirements and other factors. Any modification, equivalent replacement and improvement made within the spirit and principles of the present application should be included in the protection scope of the present application.

What is claimed is:

1. A processing method of loop instructions, comprising:
acquiring a computer program, wherein the computer program comprises a first loop body, the first loop body is generated according to a second loop body which is in a software code to be compiled, the first loop body comprises a plurality of first loop instructions, and the plurality of first loop instructions are instructions that is capable of being identified by a hardware structure of a computer device;
determining loop parameters of the first loop body according to the plurality of first loop instructions in the case where the first loop body is detected;
acquiring the plurality of first loop instructions according to the loop parameters of the first loop body; and
executing the plurality of first loop instructions.

2. The method according to claim 1, wherein the computer program comprises a plurality of computer instructions; the loop parameters comprise an end address of a loop and the number of the loop N, N is a positive integer greater than or equal to 0, the number of the loop is determined according to the first loop body; the hardware structure comprises an end address register, a buffer register and a long loop flag register;
the determining the loop parameters of the first loop body according to the plurality of first loop instructions in the case where the first loop body is detected, comprises:
if it is detected that a computer instruction is a first loop instruction and a remaining storage space of the buffer register is not 0, then storing the computer instruction into the buffer register, storing an address corresponding to the computer instruction into the end address register, and setting a flag bit of the long loop flag register to be as a short loop identifier, the short loop identifier being used to identify that a storage space occupied by first loop instructions currently stored in the buffer register is less than or equal to a total storage space of the buffer register;
determining the end address of the loop according to an end address stored in the end address register.

3. The method according to claim 2, wherein the hardware structure comprises a start address register, and the method further comprises:
if it is detected that a computer instruction is a first loop instruction, and the remaining storage space of the buffer register is 0, then storing the address corresponding to the computer instruction into the start address register, and setting the flag bit of the long loop flag register to be as a long loop identifier; identifying, by the long loop identifier, that the storage space occupied by the first loop instructions currently stored in the buffer register is greater than the total storage space of the buffer register;
in the case where a computer instruction acquired later is a first loop instruction, storing an address corresponding to the computer instruction acquired later into the end address register until all the computer instructions are acquired.

4. The method according to claim 2, wherein the acquiring the plurality of first loop instructions according to the loop parameters of the first loop body, comprises:
if the flag bit of the long loop flag register is the short loop identifier, performing an operation of acquiring all the first loop instructions from the buffer register for N times.

5. The method according to claim 2, wherein after it is detected that the computer instruction is the first loop instruction, the method further comprises:
executing the first loop instruction;
the acquiring the plurality of first loop instructions according to the loop parameters of the first loop body, comprises:

if the flag bit of the long loop flag register is the short loop identifier, then performing an operation of acquiring all the first loop instructions from the buffer register for N-1 times.

6. The method according to claim 3, wherein the acquiring the plurality of first loop instructions according to the loop parameters of the first loop body, comprises:
if the flag bit of the long loop flag register is the long loop identifier, then performing an operation of acquiring all the first loop instructions from the buffer register for N times; and
performing an operation of acquiring a corresponding first loop instruction from a program memory of the computer device starting from a start address recorded in a start register until acquiring a first loop instruction corresponding to the end address, for N times.

7. The method according to claim 3, wherein after it is detected that the computer instruction is the first loop instruction, the method further comprises:
executing the first loop instruction;
the acquiring the plurality of first loop instructions according to the loop parameters of the first loop body, comprises:
if the flag bit of the long loop flag register is the long loop identifier, then performing an operation of acquiring all the first loop instructions from the buffer register for N-1 times; and
performing an operation of acquiring a corresponding first loop instruction from a program memory of the computer device starting from a start address recorded in a start register until acquiring a first loop instruction corresponding to the end address for N-1 times.

8. The method according to claim 1, wherein the computer program comprises a plurality of computer instructions; the loop parameters comprise a start address, an end address and the number of a loop, the number of the loop is N, N is an integer greater than 0, and the number of the loop is determined according to the first loop body; and the hardware structure comprises a start address register and an end address register;
the determining the loop parameters of the first loop body according to the plurality of first loop instructions in the case where the first loop body is detected, comprises:
if it is the first time that a computer instruction is detected as a first loop instruction, then storing an address corresponding to the computer instruction into the start address register;
if it is not the first time that the computer instruction is detected as the first loop instruction, storing the address corresponding to the computer instruction into the end address register until all the computer instructions are acquired, wherein an address corresponding to a last detected first loop instruction is the end address;
wherein the acquiring the plurality of first loop instructions according to the loop parameters of the first loop body, comprises:
performing an operation of acquiring a corresponding first loop instruction from a program memory of the computer device starting from a start address recorded in a start register until acquiring a first loop instruction corresponding to the end address, for N times.

9. The method according to claim 8, further comprising:
executing a first loop instruction detected each time;
the acquiring the plurality of first loop instructions according to the loop parameters of the first loop body, comprises:
performing an operation of acquiring a corresponding first loop instruction from a program memory of the computer device starting from a start address recorded in a start register until acquiring a first loop instruction corresponding to the end address, for N-1 times.

10. The method according to claim 2, further comprising:
storing the number of the loop into a general register of the computer device,
the hardware structure further comprises: a loop number counter;
the determining the loop parameters of the first loop body according to the plurality of first loop instructions in the case where the first loop body is detected, further comprises:
acquiring the number of the loop from the general register; and
storing the number of the loop into the loop number counter.

11. A processing device of loop instructions, comprising:
at least one processor; and
a memory communicatively connected with the at least one processor; wherein,
the memory stores instructions that are executable by the at least one processor, and the instructions are executed by the at least one processor so that the at least one processor is configured to:
acquire a computer program, wherein the computer program comprises a first loop body, the first loop body is generated according to a second loop body which is in a software code to be compiled, the first loop body comprises a plurality of first loop instructions, and the plurality of first loop instructions are instructions that is capable of being identified by a hardware structure of a computer device;
the processing device further comprises: a hardware structure, configured to determine loop parameters of the first loop body according to the plurality of first loop instructions in the case where the first loop body is detected;
the at least one processor is further configured to:
acquire the plurality of first loop instructions according to the loop parameters of the first loop body; and
execute the plurality of first loop instructions.

12. The device according to claim 11, wherein the computer program comprises a plurality of computer instructions; the loop parameters comprise an end address of a loop and the number of the loop N, N is a positive integer greater than or equal to 0, the number of the loop is determined according to the first loop body; the hardware structure comprises an end address register, a buffer register, and a long loop flag register;
the hardware structure is configured to detect whether a computer instruction is a first loop instruction, and in the case where it is detected that the computer instruction is the first loop instruction and a remaining storage space of the buffer register is not 0, send the computer instruction to the buffer register and send an address corresponding to the computer instruction to the end address register, and send an instruction of setting a short loop identifier to the long loop flag register, the short loop identifier is configured to identify that a storage space occupied by first loop instructions currently stored in the buffer register is less than or equal to a total storage space of the buffer register;

the buffer register is configured to store the computer instructions;

the end address register is configured to store addresses corresponding to the computer instructions;

the long loop flag register is configured to set a flag bit of the long loop flag register to be as the short loop identifier;

the at least one processor is further configured to determine an end address of the loop according to an end address stored in the end address register;

the hardware structure further comprises a start address register;

the hardware structure is further configured to send the address corresponding to the computer instruction to the start address register, and send an instruction of setting a long loop identifier to the long loop flag register in the case where it is detected that the computer instruction is the first loop instruction, and the remaining storage space of the buffer register is 0; the long loop identifier is configured to identify that the storage space occupied by the first loop instructions currently stored in the buffer register is greater than the total storage space of the buffer register;

the start address register is configured to store the address corresponding to the computer instruction;

the long loop flag register is configured to set the flag bit of the long loop flag register to be as the long loop identifier;

the hardware structure is further configured to send an address corresponding to a computer instruction acquired later to the end address register in the case where the computer instruction acquired later is the first loop instruction, until all computer instructions are acquired; and the end address register is further configured to store the address corresponding to the computer instruction acquired later.

13. The device according to claim 12, wherein the at least one processor is further configured to, if the flag bit of the long loop flag register is the short loop identifier, then perform an operation of acquiring all the first loop instructions from the buffer register for N times.

14. The device according to claim 12, wherein the at least one processor is further configured to, if it is detected that the computer instruction is the first loop instruction, execute the first loop instruction;
if the flag bit of the long loop flag register is the short loop identifier, perform an operation of acquiring all the first loop instructions from the buffer register for N-1 times.

15. The device according to claim 12, wherein the at least one processor is further configured to, if the flag bit of the long loop flag register is the long loop identifier, perform an operation of acquiring all the first loop instructions from the buffer register for N times; and
perform an operation of acquiring a corresponding first loop instruction from a program memory of the computer device starting from a start address recorded in the start register until acquiring a first loop instruction corresponding to the end address, for N times.

16. The device according to claim 12, wherein the at least one processor is further configured to execute the first loop instruction if it is detected that the computer instruction is the first loop instruction;
if the flag bit of the long loop flag register is the long loop identifier, perform an operation of acquiring all the first loop instructions from the buffer register for N-1 times; and
perform an operation of acquiring a corresponding first loop instruction from a program memory of the computer device starting from a start address recorded in the start register until acquiring a first loop instruction corresponding to the end address, for N-1 times.

17. The device according to claim 11, wherein the computer program comprises a plurality of computer instructions; the loop parameters comprise a start address, an end address and the number of a loop, the number of the loop is N, N is an integer greater than 0, the number of the loop is determined according to the first loop body; the hardware structure comprises a start address register and an end address register;
the hardware structure is further configured to send an address corresponding to computer instructions to the start address register if it is the first time that the computer instructions are detected as first loop instructions; and if it is not the first time that the computer instructions are detected as the first loop instructions, send the address corresponding to the computer instruction to the end address register until all the computer instructions are acquired, wherein an address corresponding to the first loop instructions detected for the last time is the end address;
the start address register is configured to take the address corresponding to the computer instructions to be as the start address of the loop and store it; and
the end address register is configured to take the address corresponding to the computer instructions to be as the end address of the loop and store it.

18. The device according to claim 17, wherein the at least one processor is further configured to perform an operation of acquiring a corresponding first loop instruction from a program memory of the computer device starting from a start address recorded in a start register until acquiring the first loop instruction corresponding to the end address, for N times.

19. The device according to claim 12, wherein the computer device further comprises:
a general register, configured to store the number of the loop;
the hardware structure further comprises: a loop number counter;
the hardware structure is further configured to acquire the number of the loop from the general register and send it to the loop number counter;
the loop number counter is configured to store the number of the loop, and every time the instruction fetch unit acquires all the first loop instructions in the first loop body, the number of the loop is reduced by one.

20. A non-transitory computer-readable storage medium storing computer instructions for causing a computer to execute the method of claim 1.

* * * * *